(12) United States Patent
Wang et al.

(10) Patent No.: US 9,989,979 B2
(45) Date of Patent: *Jun. 5, 2018

(54) INFLATING MODULE FOR USE WITH AN INFLATABLE OBJECT

(71) Applicant: TEAM WORLDWIDE CORPORATION, Taipei (TW)

(72) Inventors: Cheng-Chung Wang, Taipei (TW); Chien-Hua Wang, Taipei (TW)

(73) Assignee: Team Worldwide Corporation, Taipei (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/474,073

(22) Filed: Aug. 29, 2014

(65) Prior Publication Data

US 2014/0366957 A1  Dec. 18, 2014

Related U.S. Application Data

(62) Division of application No. 13/112,847, filed on May 20, 2011, now Pat. No. 8,863,771.

(30) Foreign Application Priority Data

May 21, 2010  (CN) .......................... 2010 1 0186302

(51) Int. Cl.
*E03B 5/00* (2006.01)
*G05D 16/16* (2006.01)
*F04D 25/08* (2006.01)
*F04D 29/50* (2006.01)

(52) U.S. Cl.
CPC ........... *G05D 16/16* (2013.01); *F04D 25/084* (2013.01); *F04D 29/503* (2013.01); *Y10T 137/36* (2015.04); *Y10T 137/85994* (2015.04); *Y10T 137/86035* (2015.04)

(58) Field of Classification Search
CPC ..... A47C 27/083; A47C 27/082; F04D 25/08; F04D 27/0292; F04D 27/008; F04D 25/082; F04D 25/084; G05D 16/16; Y10T 137/36; Y10T 137/86035; Y10T 137/86051; Y10T 137/86131; Y10T 137/86139; Y10T 137/86147; Y10T 137/86155;
(Continued)

(56) References Cited

U.S. PATENT DOCUMENTS 2,257,862 A * 10/1941 Sarver ................... F04B 45/022
                                                              417/338
4,170,439 A * 10/1979 Hase ..................... F04B 45/027
                                                              417/413.1
(Continued)

*Primary Examiner* — Craig J Price

(57) ABSTRACT

An inflating module adapted to an inflatable object includes a pressure controlling assembly configured to monitor air pressure in the inflatable object after the inflatable body has been inflated and a supplemental air pressure providing device. The pressure controlling assembly is configured to automatically activate the supplemental air pressure providing device when the air pressure inside the inflatable object decreases below a predetermined threshold after inflation, and to control the supplemental air pressure providing device to provide supplemental air pressure to the inflatable object so as to maintain the air pressure of the inflatable object within a predetermined range.

18 Claims, 10 Drawing Sheets

(58) Field of Classification Search
CPC ..... Y10T 137/86163; Y10T 137/86043; Y10T 137/85994
USPC .................... 137/224, 565.17; 417/412, 538
See application file for complete search history.

(56) References Cited

U.S. PATENT DOCUMENTS

| | | | | |
|---|---|---|---|---|
| 4,585,397 | A * | 4/1986 | Crawford | F04B 43/09 310/13 |
| 4,655,497 | A * | 4/1987 | Mallett | B62J 17/02 296/78.1 |
| 5,020,176 | A * | 6/1991 | Dotson | A47C 27/082 137/487.5 |
| 5,325,551 | A * | 7/1994 | Tappel | A47C 27/082 5/709 |
| 5,418,339 | A * | 5/1995 | Bowen et al. | 181/230 |
| 5,588,811 | A * | 12/1996 | Price | A47C 20/048 417/350 |
| 6,069,423 | A * | 5/2000 | Miller et al. | 310/51 |
| 6,168,392 | B1 * | 1/2001 | Takano | A01K 63/047 417/312 |
| 6,717,299 | B2 * | 4/2004 | Bacile et al. | 310/51 |
| 7,365,277 | B2 | 4/2008 | Wang | |
| 7,475,443 | B2 * | 1/2009 | Wang | 5/713 |
| 7,647,662 | B2 | 1/2010 | Wang | |
| 7,739,763 | B2 * | 6/2010 | Wang et al. | 5/710 |
| 8,033,797 | B2 * | 10/2011 | Kehrmann et al. | 417/44.9 |
| 8,297,309 | B2 * | 10/2012 | Wang | 137/565.15 |
| 8,480,382 | B2 * | 7/2013 | Wang | F04B 17/042 318/123 |
| 8,801,392 | B2 | 8/2014 | Wang et al. | |
| 8,863,771 | B2 * | 10/2014 | Wang et al. | 137/565.17 |
| 9,062,668 | B2 | 6/2015 | Wang et al. | |
| 9,157,433 | B2 | 10/2015 | Wang et al. | |
| 2002/0175573 | A1 * | 11/2002 | Hayashi | 310/54 |
| 2004/0007302 | A1 * | 1/2004 | Hamilton | B60C 23/041 152/416 |
| 2005/0238512 | A1 * | 10/2005 | Luharuka | F04B 9/02 417/437 |
| 2007/0094806 | A1 * | 5/2007 | Beretta | A47C 27/082 5/713 |
| 2008/0109962 | A1 * | 5/2008 | Wang et al. | 5/710 |
| 2008/0109963 | A1 * | 5/2008 | Wang et al. | 5/710 |
| 2008/0286117 | A1 * | 11/2008 | Kehrmann et al. | 417/1 |
| 2009/0089935 | A1 * | 4/2009 | Wang | H01H 35/2614 5/713 |
| 2010/0024939 | A1 * | 2/2010 | Kusunoki | B60C 23/0408 152/416 |
| 2010/0286597 | A1 * | 11/2010 | Wang | F04B 43/026 604/35 |
| 2011/0020149 | A1 * | 1/2011 | Tsai | 417/321 |
| 2012/0053519 | A1 * | 3/2012 | Wang | A61M 3/0258 604/131 |
| 2014/0023518 | A1 * | 1/2014 | O'Brien | B60C 23/12 152/415 |
| 2015/0306923 | A1 * | 10/2015 | Jung | B60S 5/046 152/416 |

* cited by examiner

INFLATING MODULE FOR USE WITH AN INFLATABLE OBJECT

CROSS REFERENCE TO RELATED APPLICATION

This application is a Divisional of U.S. patent application Ser. No. 13/112,847, filed on May 20, 2011, the entirety of which is hereby incorporated by reference, and claims the benefit of China Patent Application No. CN201010186302.4, filed on May 21, 2010.

FIELD OF THE INVENTION

The present invention relates to an inflating module, and more particularly, to an inflating module used in an inflatable object so as to inflate the inflatable object and provide supplemental air pressure to the inflatable object when the air pressure of the inflatable object is under a predetermined level.

DESCRIPTION OF THE PRIOR ART

Inflatable objects have been extensively used in all kinds of applications, e.g. in hospitals for patients, outdoors for recreations and indoors for comfort. No matter what application and in what site the inflatable object is used, one thing in common for all users is that all the inflatable objects leak eventually, which causes discomfort for the users. To avoid such a situation, the user will have to constantly check the air pressure of the inflatable objects to make sure the inflatable objects provide the required comfort.

While there is a leak in the inflatable object, the user turns on the air pump to increase the air pressure inside the inflatable object and when the air pressure reaches the required level, the user turns off the air pump. This routine may be readily done during the daytime for the illumination is enough to do whatever is necessary. However, during the nighttime, especially when the user is asleep, not only the illumination is seriously insufficient, the user's willingness to undergo a troubleshooting process is also extremely low.

To avoid the inconvenience caused by the leak of the inflatable object, the best policy is that the air pressure of the inflatable object is maintained the entire time when the inflatable object is in use. And to maintain the air pressure of the inflatable object, the best option is to use another air pump to provide additional air pressure to the inflatable object in time when the air pressure of the inflatable object is decreasing. However, manual operation of the air pump to provide additional air pressure to the inflatable object is impractical and not necessary. Besides the noise from the operation of another air pump may sometimes causes sleeping disorders to the people around the air pump.

As a result of the above, it is an objective of the present invention to provide an inflating module to not only inflate the inflatable object, but also automatically provide additional air pressure when the air pressure of the inflatable object is decreasing.

SUMMARY OF THE INVENTION

The primary objective of the present invention is to provide a controlling mechanism for operation of an air pump that is used in an inflatable object. The controlling mechanism includes a valve controlling assembly responsible for open/close operation of a valve, a pressure controlling assembly responsible for sensing pressure difference to selectively activate the operation of the valve and a linkage assembly interactively sandwiched between the valve controlling assembly and the pressure controlling assembly to sense the operation of the pressure controlling assembly and consequently operate the movement of the valve controlling assembly.

In a preferred embodiment of the present invention, another objective of the present invention is that the actuation/deactivation of the air pump is controllable by the valve controlling assembly, the pressure controlling assembly or the linkage.

In a preferred embodiment of the present invention, another objective of the present invention is that the pressure controlling assembly is actuated by resilience force, atmospheric/inflatable object pressure or the combination thereof.

In a preferred embodiment of the present invention, another objective of the present invention is to have an automatic supplemental air pressure providing device in association with the operation of the air pump such that whenever there is a pressure decrease in the inflatable object, without the actuation of the air pump, the supplemental air pressure providing device is able to automatically provide air pressure to the inflatable object to maintain the inflatable object pressure at a predetermined level.

Another objective of the present invention is that the valve controlling assembly is able to select one of air paths for air to flow in/out of the inflatable object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
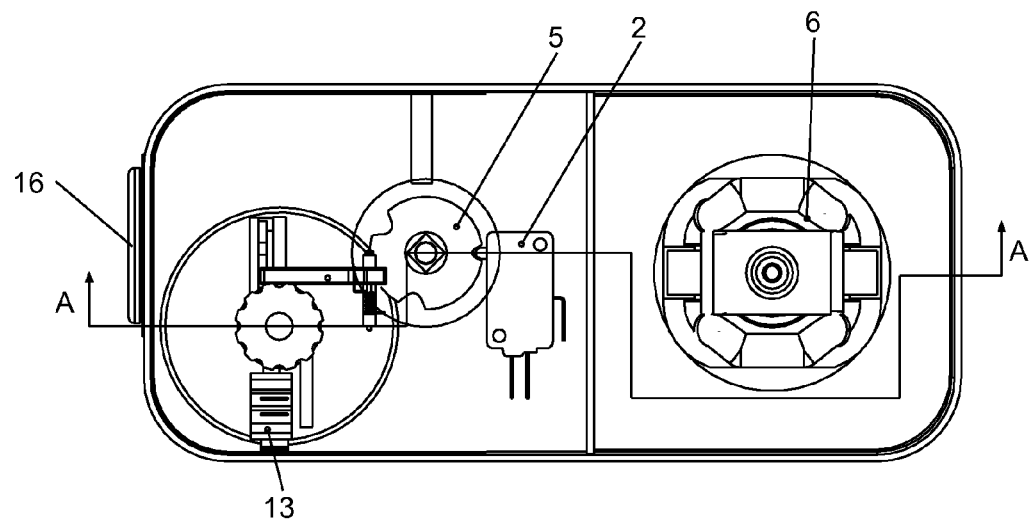
FIG. 1 is a top plan view of the valve controlling assembly of the present invention.
Figure 2A:
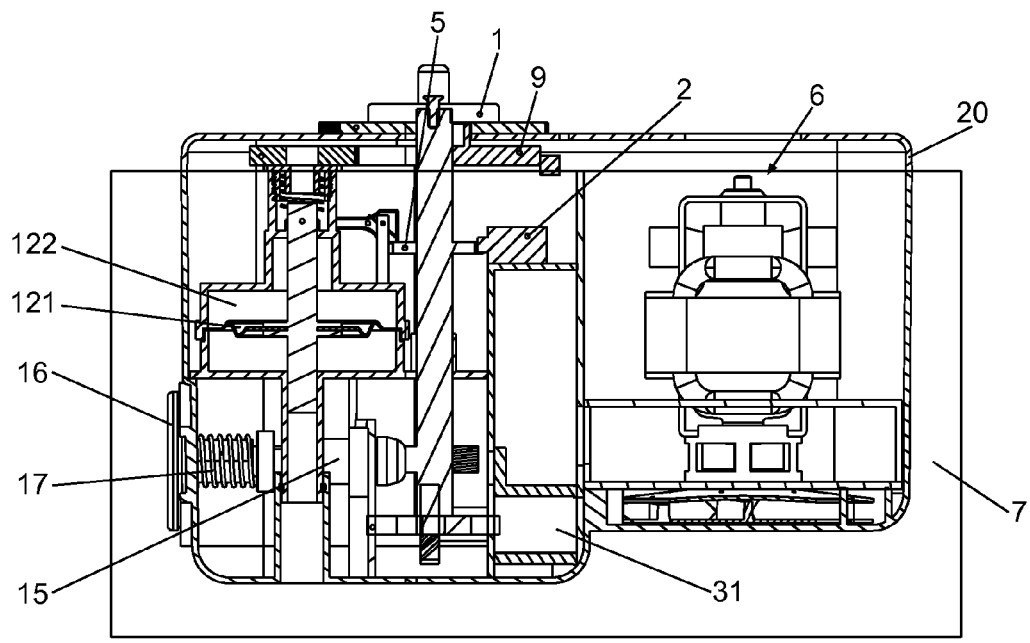
FIG. 2A is a cross sectional view showing the valve controlling assembly in association with the pressure sensing assembly of the present invention.
Figure 2B:
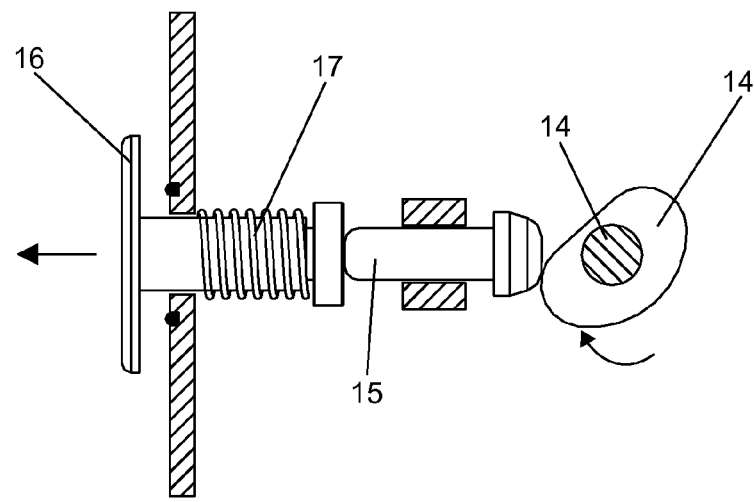
FIG. 2B is a partially cross sectional view showing the interaction between the knob and the valve of the valve controlling assembly of the present invention.

With reference to FIGS. 1, 2A-2B, 3A-3B and FIGS. 4A-4D, an inflating module constructed in accordance with the preferred embodiment of the present invention is shown and has a housing 20 associated with an inflatable object 7. Within the housing 20, a valve controlling assembly for controlling operation of an air pump 6, movement of a valve 16 as well as a path selection mechanism. The valve controlling assembly in accordance with the present invention includes a knob 1 with a shaft 14 integrally extended from the knob 1 and having a cam 140 formed on an outer periphery of the shaft 14 to be responsible for movement of an engagement shaft 15 since one of the mostly protruding ends of the cam 140 is selectively engaged with the engagement shaft 15 and a valve 16 securely formed with a spring abutted shaft 17. From the drawing of FIG. 2B, it is learned that one end of the spring abutted shaft 17 has the valve 16 integrally formed and the other end thereof is securely engaged with a distal end of the engagement shaft 15. As a result of the arrangement of the spring abutted shaft 17, it is noted that when the distal end of the spring abutted shaft 17 is pushed and the spring (shown but not numbered) is contracted, the valve 16 is thus away from the housing 20. Yet, from the illustration of FIGS. 1, 2A and 3A, it is noted that when the knob 1 is rotated so as to simultaneously rotate the shaft 14, the cam 140 is consequently rotated, which leads the movement of the engagement shaft 15.

Eventually the valve 16 is pushed away from the sidewall of the housing 20. A further illustration from FIGS. 1, 2A, 3A 3B and 4B, 4C shows that a contact disk 5 is formed on the outer periphery of the shaft 14 so that the contact disk 5 is selectively rotated in relation to the movement of the knob 1. The contact disk 5 is provided with electrical contacts (not shown) formed thereon to selectively contact a switch 2 with which the air pump 6 is electrically connected. Therefore, it is noted that rotation of the knob 1 is able to control the movement of the valve 16 as well as the operation of the air pump 6.

Aside from the description of the structure as well as the movement of the valve controlling assembly, near the bottom end of the shaft 14, a plurality of threaded-like arcuate wedges 141 are formed on the outer periphery of the shaft 14. A pivot 142 is pivotally formed on a sidewall of the housing 20 and has a ledge 143 integrally formed on a distal end thereof to mate with the arcuate wedges 141. The pivot 142 is further provided with an integrally formed path assembly 3 which has at least one air path formed to selectively communicate the internal space of the inflatable object with the internal space of the air pump 6. In this embodiment of the present invention, it is noted that there is at least one air path 31 formed on the path assembly 3. Therefore, the rotation of the knob 1 leads the rotation of the arcuate wedges 141, which forces the ledge 143 to move either upward or downward to allow the air path 31 to communicate with the internal space of the air pump 6. Therefore, it is also learned that the rotation of the knob 1 can also determine the path of air flow, i.e. into or out of the inflatable object.

From the illustration of FIGS. 3A, 3B, 4A-4D, as an example of the operation of the path selection mechanism, it is learned that when the knob 1 is rotated to activate the operation of the air pump 6 as well as the movement of the valve 16, the arcuate wedges 141 are also rotated. As the ledge 143 is mated with the arcuate wedges 141, the ledge 141 is moved, which ultimately leads the pivot 142 to move. Because the pivot 142 is integrally formed with the path assembly 3, movement of the pivot 142 moves the path assembly 3, up and down in this embodiment such that a predetermined air path is decided when turning the knob 1 clockwise or counterclockwise.

Figure 3A:
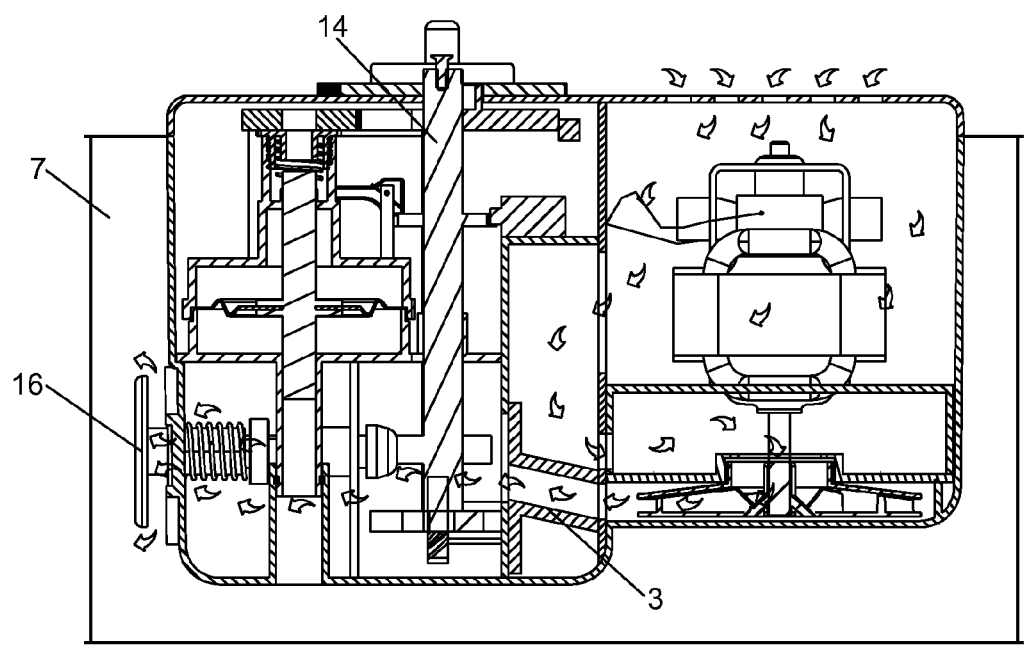
FIG. 3A is a cross sectional view showing the operation of the valve controlling assembly consequently leads the open of an inflow path to allow air outside the inflatable object to flow into the inflatable object.
Figure 3B:
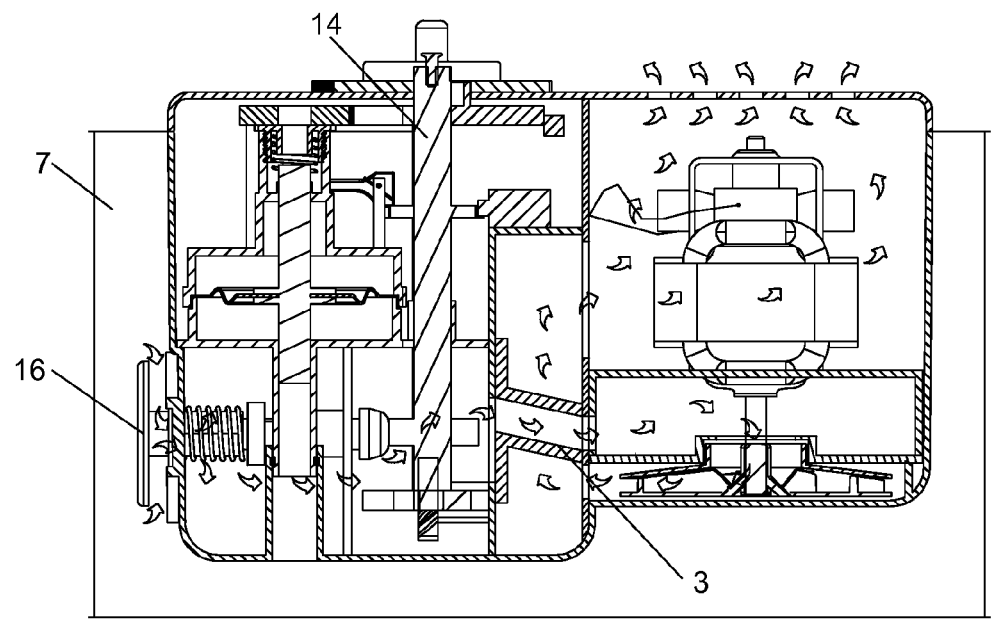
FIG. 3B is a cross sectional view showing the operation of the valve controlling assembly consequently leads the open of an outflow path to allow air inside the inflatable object to flow out of the inflatable object.
Figure 4A:
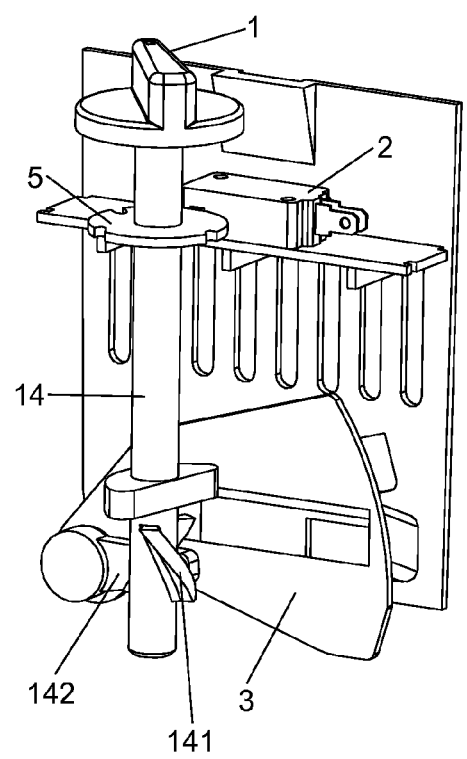
FIG. 4A is a perspective view showing the structure of a portion of the valve controlling assembly of the present invention.
Figure 4B:
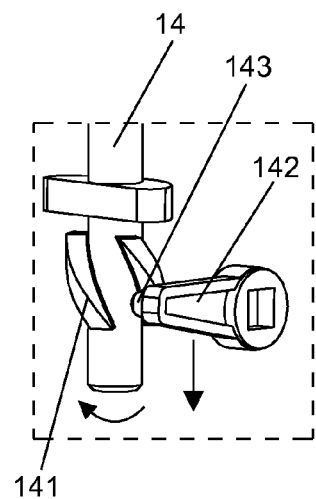
FIG. 4B is a perspective view showing the structure of another portion of the valve controlling assembly of the present invention.
Figure 4C:
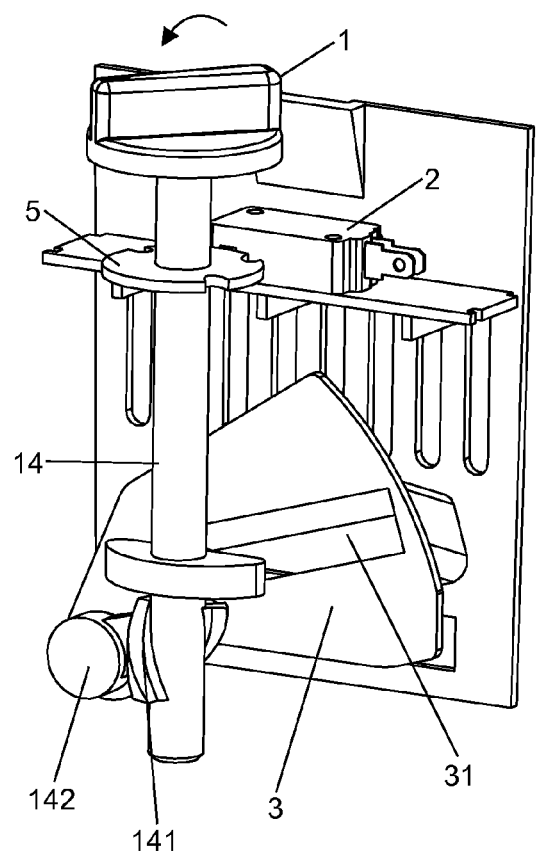
FIG. 4C is a perspective view showing the consequence of the rotation of the knob of the valve controlling assembly of the present invention.
Figure 4D:
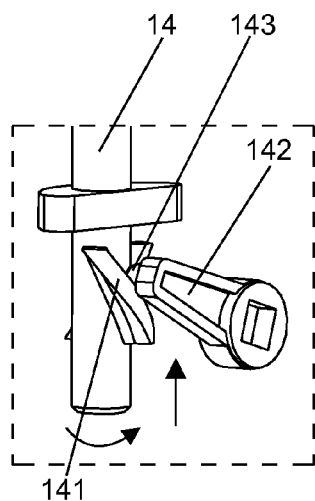
FIG. 4D is still a perspective view showing the consequence of the rotation of the knob of the valve controlling assembly of the present invention.
Figure 5:
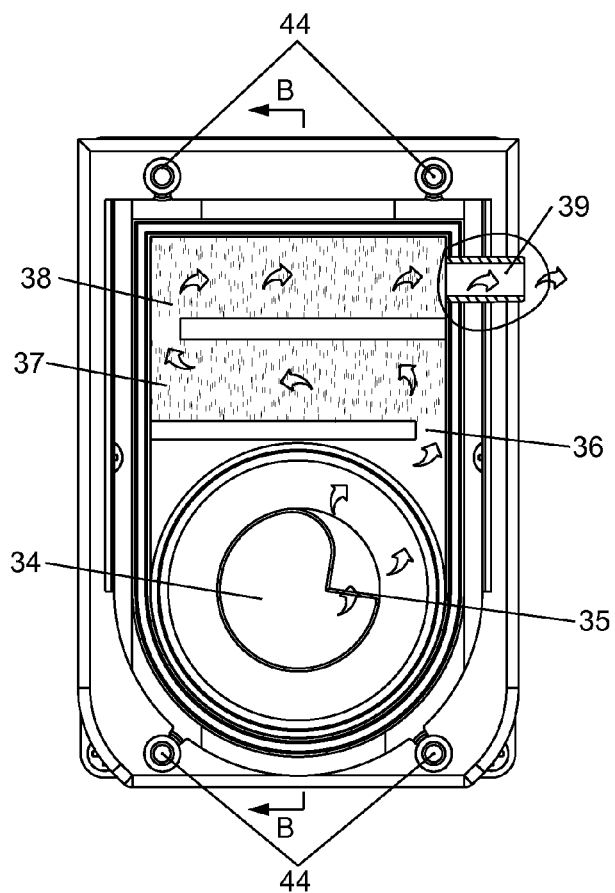
FIG. 5 is a plan view showing the internal structure of the supplemental air pressure providing device of the present invention.

As described, the rotation of the knob 1 can be clockwise or counterclockwise and because of the provision of the contact disk 5 on the shaft 14, the air pump 6 can be activated to provide air flow into or out of the inflatable object, as can best be seen from FIGS. 3A and 3B.

With reference to FIGS. 5-11, it is noted that the automatic supplemental air pressure providing device of one preferred embodiment of the present invention has an outer housing 43 with a first inlet 21. Inside the outer housing 43, an inner housing 23 is integrally formed and has a second inlet 22, a nozzle 39 and a first air chamber 46 defined inside the inner housing 23. The first air chamber 46 is composed of a casing 25 having an inlet 24 and an outlet 29, an oscillator 42 and an air blower 50 operatably connected to the oscillator 42 to provide supplemental air pressure to the inflatable object when needed. The air blower 50 includes a metal housing 47 and a rubber cap 48 securely fixed inside the metal housing 47. A first check valve 26 and a second check valve 27 are provided inside the rubber cap 48 to allow air to sequentially flow through the first check valve 26 and the second check valve 27. The air chamber 46 also has a absorbent (such as a cotton silencer) 28 provided therein to keep the noise caused by the operation of the air blower 50 as low as possible. It is reasonable to assume that the activation of the air pump 6 in the preferred embodiment can also activate the operation of the automatic supplemental air pressure providing device in a standby mode. After the supplemental air pressure providing device is in a standby mode, a pressure controlling assembly 121/122 as described starts monitoring air pressure in the inflatable object. Once the air pressure inside the inflatable object is below a predetermined range, the supplemental air pressure providing device will then automatically provide air pressure to the inflatable object to always maintain the air pressure of the inflatable object within a predetermined range.

Figure 12:
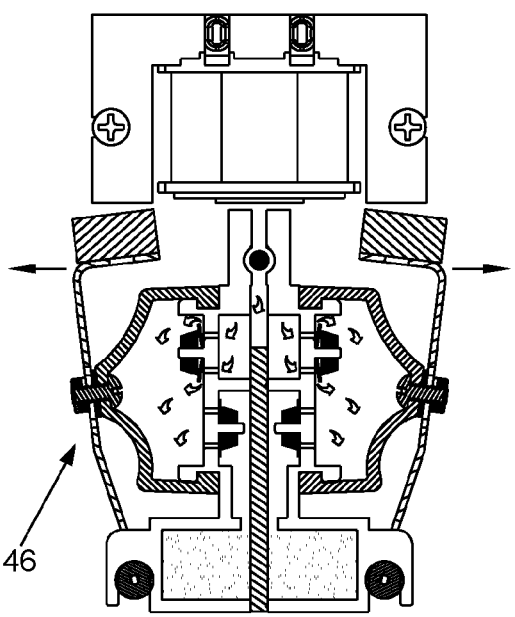
FIG. 12 is a schematic cross sectional view showing the operation of the supplemental air pressure providing device of the present invention.
Figure 13:
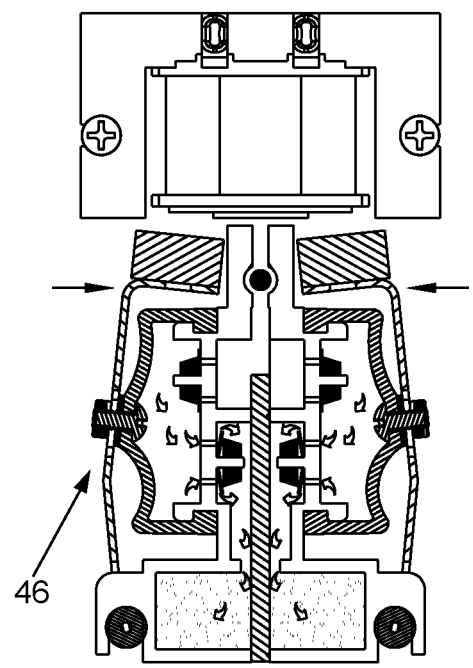
FIG. 13 is still another schematic cross sectional view showing the operation of the supplemental air pressure providing device in a different state.

The operational sequence of the automatic supplemental air pressure providing device of a preferred embodiment of the present invention is that after the oscillator 42 is activated electrically, magnets provided on top of the metal casing 47 will be moved by the activated oscillator 42. As the magnets (not numbered) are securely provided on an outer periphery of the metal casing 47, movement of the magnets drives the metal casing 47 to move simultaneously. Movement of the metal casing leads the rubber cap 48 to move like a bellow, which drives air sucked in from ambient to flow through the first check valve 26, the second check valve 27, the absorbent 28 and the outlet 29. Once the air flow is out of the outlet 29, it is flowing into the second chamber 31, as shown in FIGS. 12 and 13.

Figure 6:
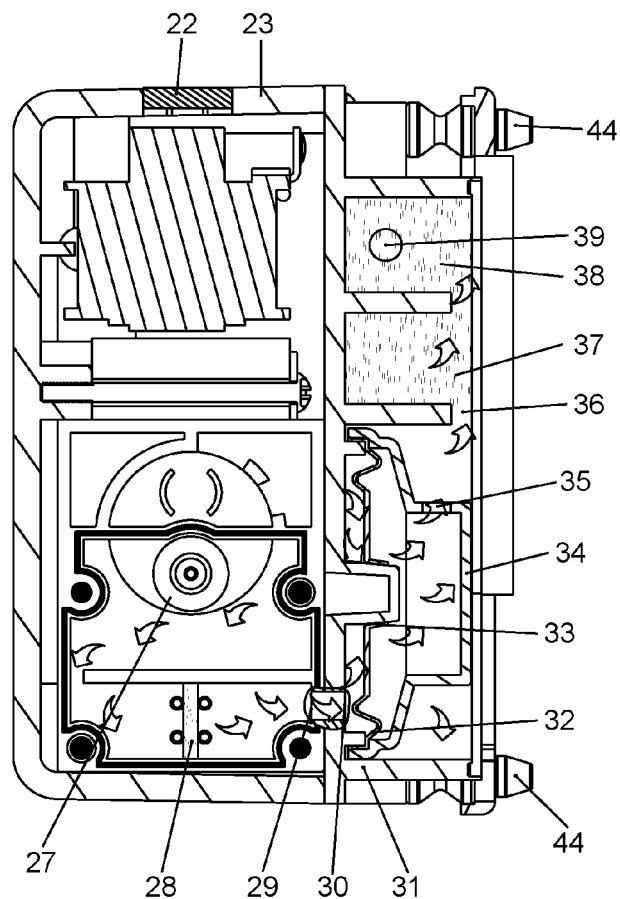
FIG. 6 is a cross sectional view from line B-B of FIG. 5.
Figure 7:
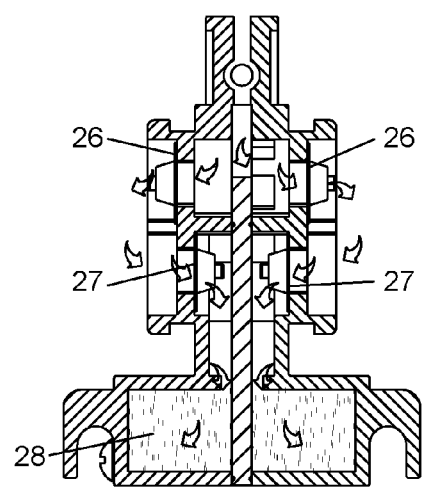
FIG. 7 is a cross sectional view showing the structure of the supplemental air pressure providing device of the present invention.
Figure 8:
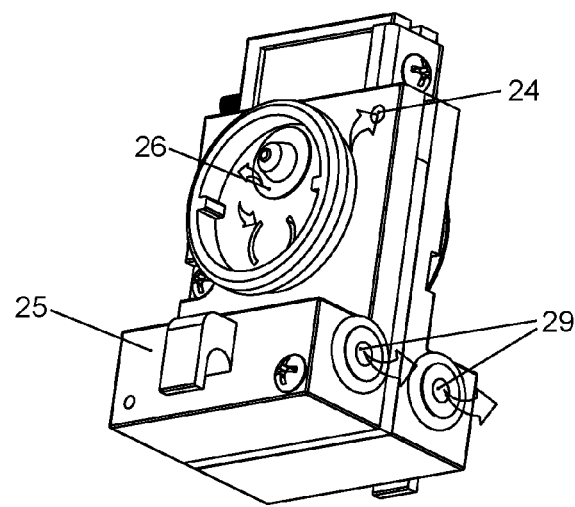
FIG. 8 is a perspective view of the supplemental air pressure providing device of the present invention.
Figure 9:
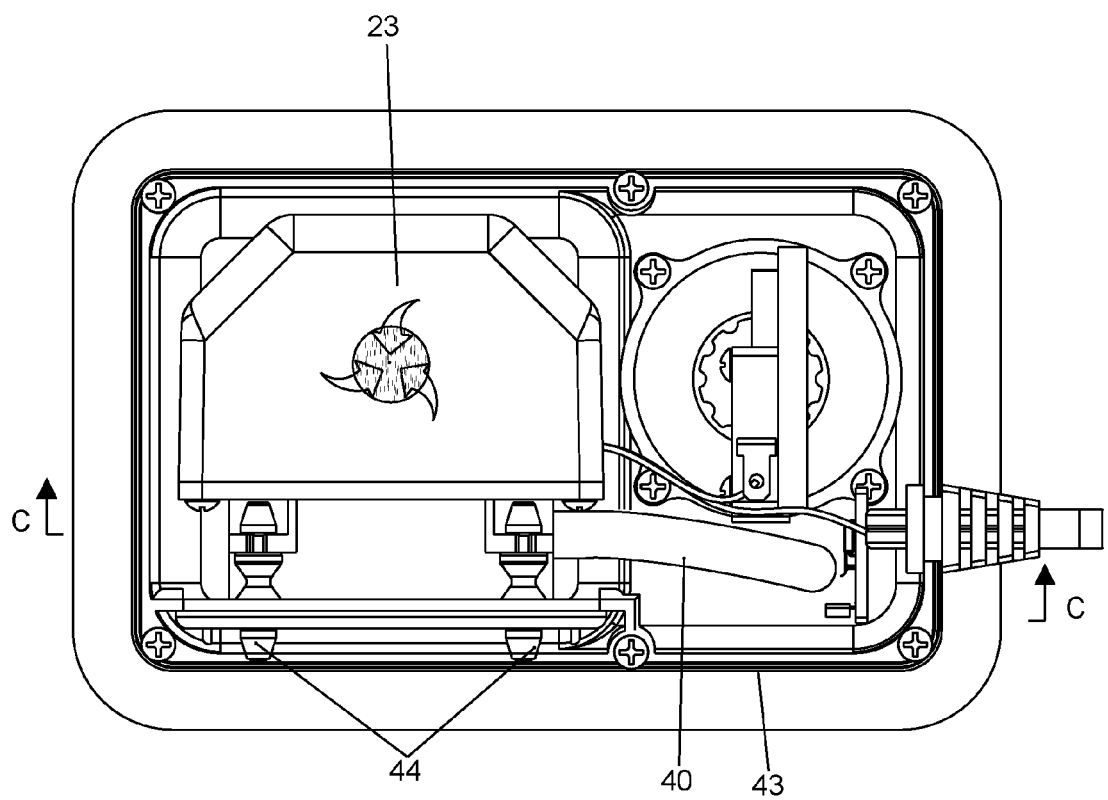
FIG. 9 is a top plan view of the supplemental air pressure providing device of the present invention.
Figure 10:
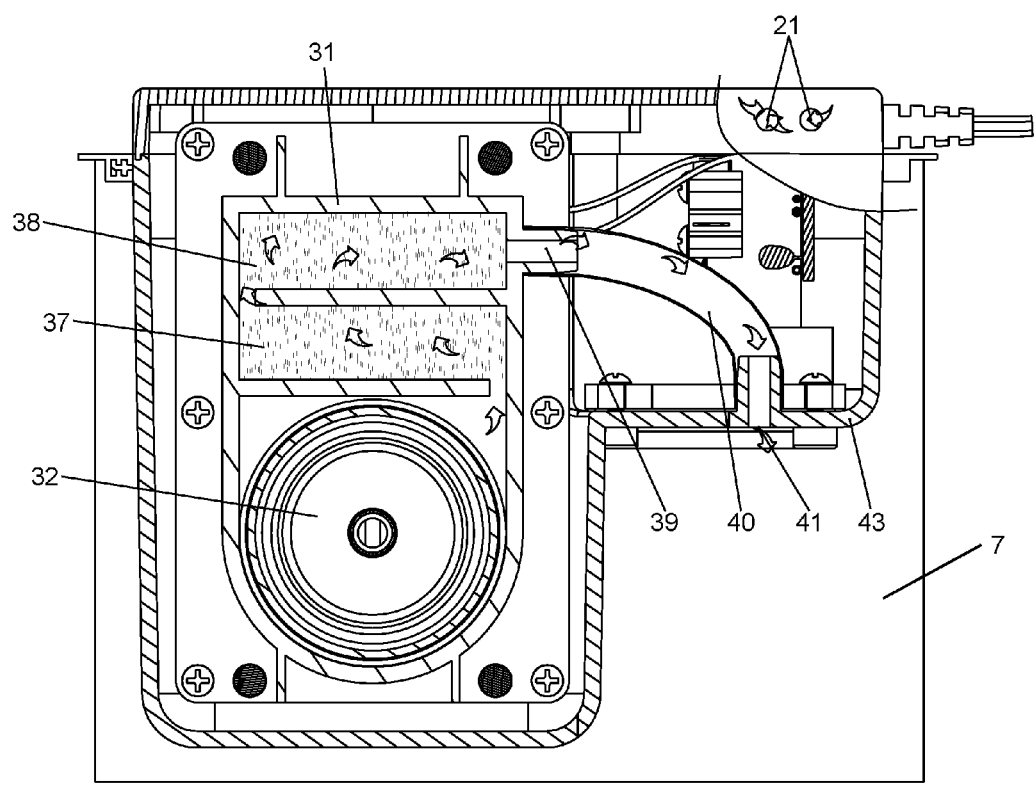
FIG. 10 is a cross sectional view from line C-C of FIG. 9.
Figure 11:
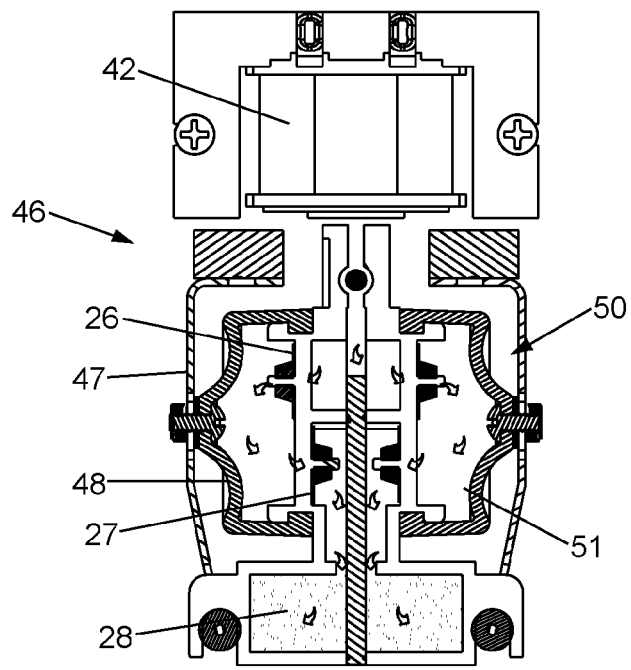
FIG. 11 is cross sectional view showing the internal structure of the supplemental air pressure providing device.

With reference to FIGS. 6 and 10, the inner casing 23 further has a second air chamber 31 with an inlet 30 and the nozzle 39. An air duct 40 is provided between the nozzles 39, 41. To enhance the air flow inside the second air chamber 31, a check valve 32 and further absorbent 37, 38 are provided. The check valve 32 has an outlet 33 and a unidirectional cap 34 with an outlet 35 defined in the unidirectional cap 34. In order to strengthen the ability to lower down the noise, additional absorbent or silencer may also be applied to the inlet 22 and/or the nozzle 41. Between the outer housing 43 and the inner housing 23, noise silencer 44, such as rubber, may be added to harmonize the vibrations.

When the automatic supplemental air pressure providing device of the preferred embodiment of the present invention is in operation, it is learned that air flows from the inlet 21 and enters the outer casing 43. Then the air continues to flow through the second inlet 22 and enters the inner housing 23. Through the inlet 24, the air flows into the casing 25 and passes the first check valve 26 and the second check valve 27 before passing through the space 51 where the air is compressed due to the movement of the metal casing 47 as well as the rubber cap 48. Eventually the air exits from the outlet 29 after passing through the absorbent 28. Then the air flows into the second air chamber 31 and passes through the check valve 32, the outlet 33 and enters the unidirectional cap 34. Finally, the air flows to the chamber 36 from the outlet 35 and reaches absorbent 37, 38 and eventually reaches the inflatable object from the nozzle 39 before passing through the air duct 40. From the structure as described hereinbefore, it is learned that all the vibrations, noise caused by the operation of either or both the air blower and the air pump shall be minimized to reach a goal of providing a quiet and comforting structure to the user.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. An inflating module adapted to an inflatable object comprising an inflatable body, the inflating module used in conjunction with a pump that provides primary air pressure and comprising:
   a pressure controlling assembly configured to monitor air pressure in the inflatable object after the inflatable body has been inflated by the pump; and
   a supplemental air pressure providing device, wherein the pressure controlling assembly is configured to automatically activate the supplemental air pressure providing device when the pressure controlling assembly detects that the air pressure inside the inflatable object decreases below a predetermined threshold after inflation by the pump, and to control the supplemental air pressure providing device to provide supplemental air pressure to the inflatable object so as to maintain the air pressure of the inflatable object within a predetermined range.

2. The inflating module as claimed in claim 1, wherein the supplemental air pressure providing device comprises a housing with an air blower received inside the housing to provide supplemental air pressure, an air chamber defined inside the housing, and absorbent disposed in the air chamber such that noise caused by operation of the air blower is minimized by the absorbent.

3. The inflating module as claimed in claim 1, wherein the supplemental air pressure providing device further comprises an outer housing with an inner housing integrally formed inside.

4. The inflating module as claimed in claim 3, wherein the supplemental air pressure providing device further comprises at least one noise silencer positioned between the outer housing and the inner housing.

5. The inflating module as claimed in claim 1, wherein the supplemental air pressure providing device further comprises a nozzle through which air is pumped and absorbent connected to the nozzle for reducing noise inside the nozzle.

6. An inflating module adapted to an inflatable object comprising an inflatable body, the inflating module comprising:
   a pressure controlling assembly configured to monitor air pressure in the inflatable object after the inflatable body has been inflated; and
   a supplemental air pressure providing device comprising:
      an inner housing comprising a first inlet in communication with ambient air;
      a first chamber located in the inner housing, the first chamber comprising a second inlet and a first outlet, the second inlet being in communication with the first inlet;
      an oscillator;
      an air blower operably connected to the oscillator, the air blower comprising a metal casing and a rubber cap arranged such that activation of the oscillator drives the metal casing to expand and contract, thereby causing the rubber cap to draw air into the second inlet and drive air out of the first outlet;
      a second chamber having a third inlet and a second outlet, the third inlet being in communication with the first outlet; and
      a one-way valve arranged to prevent a back flow of air from the inflatable body through the supplemental air pressure providing device;
   wherein the pressure controlling assembly is configured to automatically activate the supplemental air pressure providing device when the pressure controlling assembly detects that the air pressure inside the inflatable object decreases below a predetermined threshold after inflation, and to control the supplemental air pressure providing device to provide supplemental air pressure to the inflatable object so as to maintain the air pressure of the inflatable object within a predetermined range.

7. The inflating module as claimed in claim 6, wherein the supplemental air pressure providing device comprises a housing with the air blower received inside the housing, an air chamber defined inside the housing, and absorbent disposed in the air chamber such that noise caused by operation of the air blower is minimized by the absorbent.

8. The inflating module as claimed in claim 6, wherein the supplemental air pressure providing device further comprises an outer housing, wherein the inner housing is integrally formed inside the outer housing.

9. The inflating module as claimed in claim 8, wherein the supplemental air pressure providing device further comprises at least one noise silencer positioned between the outer housing and the inner housing.

10. The inflating module as claimed in claim 6, wherein the supplemental air pressure providing device further comprises a nozzle through which air is pumped and absorbent connected to the nozzle for reducing noise inside the nozzle.

11. An inflating module adapted to an inflatable object comprising an inflatable body, the inflating module used in conjunction with a pump that provides primary air pressure and comprising:
a pressure controlling assembly configured to monitor air pressure in the inflatable object after the inflatable body has been inflated by the pump; and
a supplemental air pressure providing device comprising:
an inner housing comprising a first inlet in communication with ambient air;
a first chamber located in the inner housing, the first chamber comprising a second inlet and a first outlet, the second inlet being in communication with the first inlet;
an oscillator, a metal casing and a rubber cap arranged such that activation of the oscillator drives the metal casing to expand and contract, thereby causing the rubber cap to draw air into the second inlet and drive air out of the first outlet; and
a second chamber having a third inlet and a second outlet, the third inlet being in communication with the first outlet and the second outlet being in communication with the inflatable body;
wherein the pressure controlling assembly is configured to automatically activate the supplemental air pressure providing device to provide supplemental air pressure to the inflatable object when the pressure controlling assembly detects that the air pressure inside the inflatable object decreases below a predetermined threshold after inflation by the pump.

12. The inflating module as claimed in claim 11, wherein the pressure controlling assembly is configured to control the supplemental air pressure providing device to maintain the air pressure of the inflatable object within a predetermined range.

13. The inflating module as claimed in claim 11, further comprising an outer housing comprising a fourth inlet, the inner housing being received in the outer housing and the first inlet being in communication with ambient air via the fourth inlet.

14. The inflating module as claimed in claim 13, wherein the supplemental air pressure providing device further comprises at least one noise silencer positioned between the outer housing and the inner housing.

15. The inflating module as claimed in claim 14, wherein the at least one noise silencer comprises rubber.

16. The inflating module as claimed in claim 11, wherein a noise absorbent is applied to the first inlet.

17. The inflating module as claimed in claim 11, further comprising a third chamber between the second chamber and the inflatable body, the third chamber having a fourth inlet and a third outlet, the fourth inlet being in communication with the second outlet and the third outlet being in communication with the inflatable body, wherein the third chamber comprises a noise absorbent.

18. The inflating module as claimed in claim 17, further comprising an air duct, wherein the third outlet comprises a nozzle and is in communication with the inflatable body via the nozzle and air duct.

* * * * *

(12) POST-GRANT REVIEW CERTIFICATE (215th)
United States Patent
Wang et al.

(10) Number: US 9,989,979 J1
(45) Certificate Issued: Jan. 18, 2022

(54) INFLATING MODULE FOR USE WITH AN INFLATABLE OBJECT

(71) Applicant: TEAM WORLDWIDE CORPORATION

(72) Inventors: Cheng-Chung Wang; Chien-Hua Wang

(73) Assignee: Team Worldwide Corporation

Trial Number:

PGR2019-00015 filed Nov. 12, 2018

Post-Grant Review Certificate for:

Patent No.: 9,989,979
Issued: Jun. 5, 2018
Appl. No.: 14/474,073
Filed: Aug. 29, 2014

The results of PGR2019-00015 are reflected in this post-grant review certificate under 35 U.S.C. 328(b).

POST-GRANT REVIEW CERTIFICATE
U.S. Patent 9,989,979 J1
Trial No. PGR2019-00015
Certificate Issued Jan. 18, 2022

AS A RESULT OF THE POST-GRANT REVIEW PROCEEDING, IT HAS BEEN DETERMINED THAT:

Claims 1-5 are cancelled.

\* \* \* \* \*